United States Patent [19]

Cecka et al.

[11] 4,129,634

[45] Dec. 12, 1978

[54] METHOD FOR PREPARING A COMPOSITE HIGH STRENGTH TO WEIGHT STRUCTURE HAVING SHELL AND SLEEVED CORE

[75] Inventors: Andrew M. Cecka, Thousand Oaks; Pol Dano, Camarillo; Paul G. Pawling, Oxnard, all of Calif.

[73] Assignee: Fansteel, Inc., North Chicago, Ill.

[21] Appl. No.: 854,533

[22] Filed: Nov. 25, 1977

Related U.S. Application Data

[62] Division of Ser. No. 703,136, Jul. 7, 1976, Pat. No. 4,070,021.

[51] Int. Cl.$^2$ .............................................. B29D 27/00
[52] U.S. Cl. .................................. 264/45.3; 264/46.6; 264/282; 264/DIG. 17
[58] Field of Search .................. 264/46.6, 46.5, 46.7, 264/46.9, 282, DIG. 17

[56] References Cited

U.S. PATENT DOCUMENTS 4,061,520  12/1977  Cecka et al. ................... 264/45.1 X Primary Examiner—Philip Anderson

[57] ABSTRACT

A novel structural member, such as a tennis racket frame, having an unusually high strength to weight ratio is provided comprising an expanded foamed plastic core integrally bonded to a shell comprising at least one layer of resin-coated unidirectionally oriented graphite fibers, the shell completely encasing the core at any transverse cross section of the structural member, with a seamless sleeve made of a thin, flexible cellulosic film between the core and the shell.

The structural member is prepared by arranging within a mold cavity an outer shell comprising at least one sheet of resin-coated unidirectionally oriented graphite fibers and a core comprising a foamable resin composition while the core is maintained within a seamless sleeve made of a thin, flexible cellulosic film, sealing the mold cavity and activating the foamable resin composition to cause expansion and generate pressure within the mold cavity and thereby provide intimate bonding of the core to the shell.

11 Claims, 8 Drawing Figures

U.S. Patent Dec. 12, 1978 4,129,634
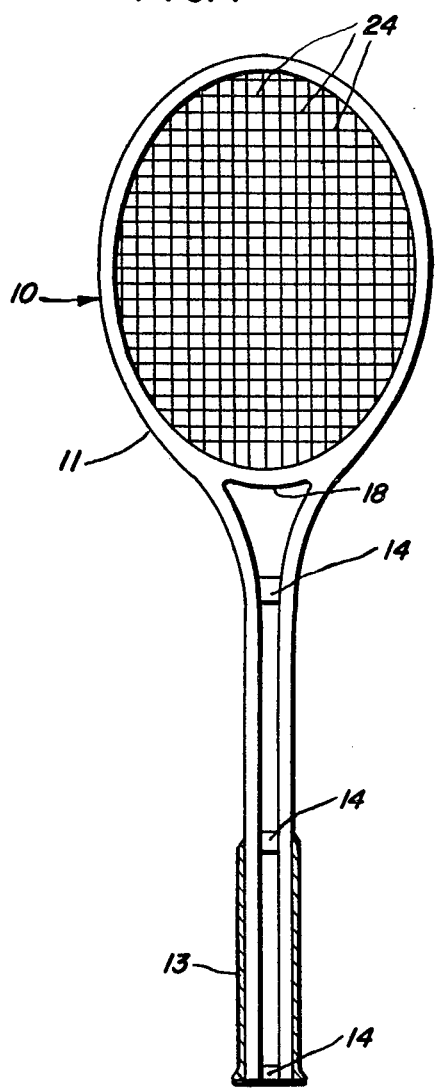
FIG. 1
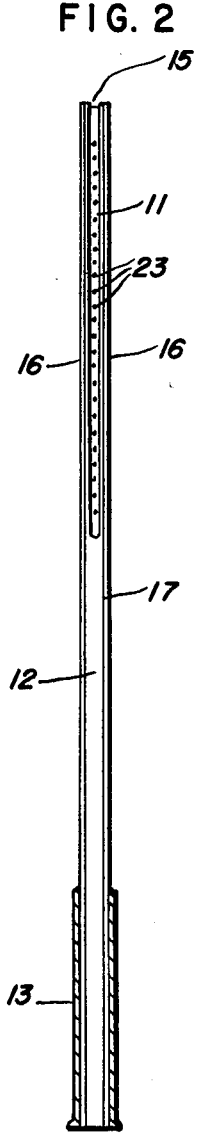
FIG. 2
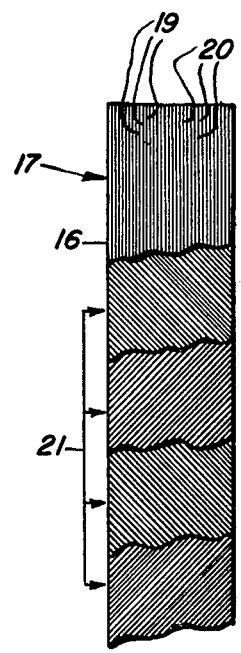
FIG. 3
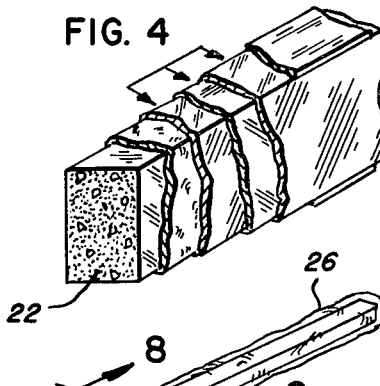
FIG. 4
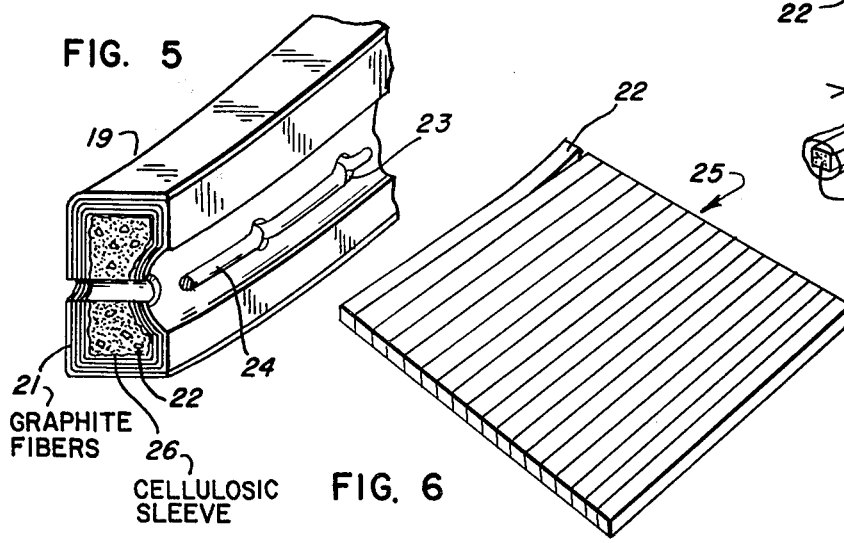
FIG. 5 · FIG. 6
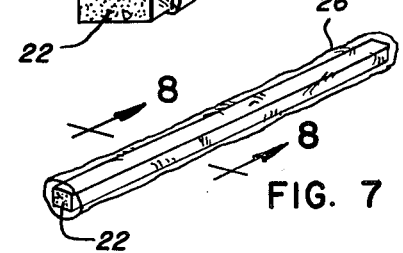
FIG. 7
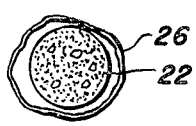
FIG. 8

METHOD FOR PREPARING A COMPOSITE HIGH STRENGTH TO WEIGHT STRUCTURE HAVING SHELL AND SLEEVED CORE

This is a division, of application ser. No. 703,136, filed July 7, 1976 now U.S. Pat. No. 4,070,021.

BACKGROUND OF THE INVENTION

This invention relates to a lightweight, high strength and stiffness composite structure that provides superior performance for a wide variety of applications, especially in recreational products such as tennis racket frames, skis and hockey sticks, and in body protective equipment such as football helmets, motorcycle helmets, shin guards and shoulder pads. The invention also provides a method of making such a structure.

The outstanding characteristics and benefits that the structure of this invention offers over products of the prior art are especially described in this specification with reference to tennis rackets as an example. However, as will be readily apparent to those skilled in the art, the product and the method of this invention provide superior characteristics for many applications where a material is desired that possesses low weight combined with high strength, stiffness, torsional resistance, excellent stability and long endurance.

The earliest tennis rackets utilized frames of solid wood, but these were superseded by laminated wood construction, such as selected ash, maple and birch laminates, sometimes with built-in, steel-like fibers. While the laminated wood construction offers improvements over solid wood, it suffers disadvantages such as relatively low tensile and compressive strength, poor life and lack of uniformity. In addition, it is subject to warpage and scuffing, tends to lose color, loses stiffness and strength properties, has a relatively short fatigue life, offers high wind resistance in cross sections large enough to provide the needed strength, and is difficult to manufacture to uniform weight, balance, density and mechanical properties.

Tennis rackets with metal frames, such as tubular, round, channel, I-beam extrusions and other configurations, have been constructed from alloy steel, magnesium, and especially aluminum. With the metal frames, there is a limit on weight to achieve the desired performance, and shock and vibration are transmitted to the player, especially on mis-hit shots, which contributes to player fatigue and to the "tennis elbow" injury. Objectionable sound transmission (sometimes rings) is another drawback of metallic frames. The metal frames also cause a trampoline effect. In addition, the grommets or eyelets used to guide the tennis string tend to crack prematurely.

Composite laminated fiber glass reinforced plastic tennis rackets have been produced by techniques such as injection molding, transfer molding, and compression molding. U.S. Pat. No. 3,483,055 to R. W. Eshbaugh describes a fiber glass construction for tennis racket frames in which the frames are made of alternating layers of resin-impregnated glass fibers and of absorbent paper. Such fiber glass tennis rackets are generally regarded as being too flexible and the desired rigidity cannot be obtained.

It is technically feasible to produce a similar composite structure using resin-impregnated graphite fibers in place of the glass fibers but such a structure still does not have the desired deflection characteristics.

A sandwich construction in tennis rackets, made by adhering glass fiber layers over both faces of a wooden racket frame results in improved service life, especially with regard to fatigue characteristics, but the tennis strings tend to loosen, dynamic response is lost, and there is a limitation on weight reduction.

An improved sandwich construction is obtained by adhering graphite fiber layers over a wooden frame, but such a construction still has the above-mentioned limitations of a wood core.

Sandwich constructions with cores other than wood also have been developed or investigated. These include a foamed plastic core with aluminum facing, and low density, preformed rigid plastic cores with aluminum, fiber glass or graphite fiber facings. These constructions suffer a number of disadvantages including creep and relaxation of tension on the strings. In the cases of metal facings, the mismatch in co-efficient of thermal expansion between the facing and core causes problems in fabrication and during use because of residual stresses.

Still another sandwich construction is described in U.S. Pat. No. 3,640,533 to T. B. Davis. This construction is comprised of a reinforcement mesh of metal covered on opposite sides by fiber glass reinforced resin, which is attached to the wood core of the racket. The metal mesh has a degrading effect on the composite due to the differences in elastic properties between the metal and the wood, and the system cannot be made as light as the composite structure of the instant invention and still achieve the same level of stiffness and resistance to fatigue.

Still another composite structure, useful in skis, is disclosed in U.S. Pat. No. 3,493,240 to H. R. Jenks. This structure comprises upper and lower skins of resin-impregnated fiber glass sheets bonded to longitudinally extended channel members, which provide hollow cores. The construction is difficult to process, complex, and susceptible to a great number of variables in production. Further, leaks in the air bags (hollow cores) may not be known until the part is constructed. Further, the fiber glass facing does not provide the stiffness-to-strength ratio provided by this invention.

In coassigned Application Ser. No. 442,204, filed Feb. 13, 1974 by Andrew M. Cecka and Pol Dano, now abandoned, there is described a structural member comprising an expanded foamed plastic core integrally bonded to a shell comprising a plurality of layers of resin-coated unidirectionally oriented graphite fibers at least one of the layers having fibers oriented in a direction different from the direction of orientation in at least one other layer, the shell completely encasing the core at any transverse cross section of the structural member. The structural member is prepared by arranging within a mold cavity an outer shell made of a plurality of layers of unidirectionally oriented graphite fibers and a core comprising a foamable resin composition, sealing the mold and activating the foamable resin composition to cause expansion and generate pressure within the mold cavity and thereby provide intimate bonding of the core to the shell.

Structural members, and specifically tennis rackets, made in accordance with the aforementioned invention have been made and sold and have been well received by both amateur and professional players because of their unique combination of low weight, high strength, stiffness, torsional resistance, excellent stability and long endurance.

It has been found, however, that on occasion in the aforementioned method, leakage of the core composition occurs during its expansion and curing in the mold and that the integrity of the product is thereby impaired. To deal with this problem, the process and product were modified by inserting the expandable core into a sleeve made of a thin, flexible polyethylene terephthalate film sealed to itself in a cylindrical configuration.

The use of such a sleeve reduced but did not eliminate the incidence of "leakers" because the sleeves, themselves, were subject to occasional rupture along their seams. In addition, it has been found that sleeves made of other plastic films, such as polyethylene and polyvinyl chloride do not bond reliably to the core or to the shell and that such sleeves are therefore an element of weakness in the final structure.

BRIEF SUMMARY OF THE INVENTION

In accordance with the present invention, the above described deficiencies in structural members for tennis rackets and other applications are overcome by providing an integrally bonded, lightweight, strong and stable composite structure of high quality and playing characteristics, and specifically a composite structure comprised of an expanded core integrally bonded in a one-step molding process to a resin-impregnated, high strength graphite fiber shell with a seamless sleeve made of a thin, flexible cellulosic film between the core and the shell. The structure of this invention offers a wide versatility in design to meet a wide range of flexural and torsional characteristics, and to meet specific requirements not obtainable in any prior construction.

Specifically, the structural member of this invention comprises a core of an expanded cellular, or foamed, resinous material within a seamless sleeve made of a thin, flexible cellulosic film integrally bonded to a shell comprising at least one layer of resin-coated unidirectionally oriented graphite fibers, said shell completely encasing said core within said sleeve at any cross section transverse to the length of said member. In preferred embodiments, the shell comprises a plurality of layers of resin-coated unidirectionally oriented graphite fibers and at least one of said layers has its fibers oriented in a direction different from the direction of orientation of the fibers in at least one other layer.

Preferably, the foamed plastic core is relatively light, ranging from about 20 to about 60 pounds per cubic foot and preferably from about 30 to about 50 pounds per square foot.

The structural member is prepared by inserting an elongated core strip comprising a foamable resin composition into a seamless sleeve made of a thin, flexible cellulosic film, wrapping at least one sheet of resin-coated unidirectionally oriented graphite fibers about said core within said sleeve, sealing said wrapped core within mold cavity and activating the foamable resin composition to cause expansion and generate pressure within said mold cavity to thereby provide intimate bonding of the core to the shell.

The cellulosic sleeve is made of regenerated cellulose and is of a cross sectional size which, when opened to full cross section, is larger than the cross section of the foamable resin composition and at least as large as the cross section of the free space within the mold which the composition is to fill when expanded. Preferably, the sleeve is somewhat larger in cross section than the cross section of the free space within the mold so that the sleeve is somewhat crinkled even after the composition within it has expanded within the mold. Typically, the cellulosic sleeve has a wall thickness from about 0.75 to about 1.75 mils and a diameter from about ½ inch to about ¾ inch, depending on the desired cross section of the core after expansion.

In one embodiment of the invention, a plurality of elongated graphite fiber layers is employed, at least the innermost of which has parallel fibers oriented at 45° to the length of the layer and is wrapped widthwise around the core so that the width of the layer before wrapping is equivalent to at least one circumference of the core, and preferably several circumferences of the core. Because of a tendency of the fibers to separate and fray in this configuration at the leading side edge of the innermost graphite fiber layer, a veiling strip of open construction is used in a preferred aspect of this invention as a first wraparound of the core with its trailing edge covering the leading edge of the first graphite fiber layer, as described in the concurrently filed and coassigned application of Pol Dano, Serial No.

BRIEF DESCRIPTION OF THE DRAWINGS

The invention is best understood by reference to the drawings of which:

FIG. 1 is a front elevation of a tennis racket employing the composite structure of this invention, the grip being shown in section;

FIG. 2 is a side elevation of a tennis racket of this invention, the grip being shown in section;

FIG. 3 is an enlarged detail view of a portion of the resin-coated, oriented graphite fiber structure used in the shell of the composite structure of this invention, with successive layers serially exposed;

FIG. 4 is an enlarged cross section, shown in perspective, showing the integrally bonded composite structure of this invention, with successive layers serially exposed;

FIG. 5 is an enlarged cross section, shown in perspective, showing the details of the recessed groove and holes used for the strings in the frame of a tennis racket employing the composite structure of this invention;

FIG. 6 is a perspective of a slab of foamable core composition slit into strips of appropriate width for the formation of a plurality of cores;

FIG. 7 is a perspective of a foamable core inserted into a seamless sleeve made of a thin, flexible cellulosic film; and FIG. 8 is an enlarged cross section of the core and sleeve of FIG. 7 at plane 8—8.

DETAILED DESCRIPTION

In the illustrated embodiment of the invention, tennis racket frame 10 comprises head section 11 and handle section 12 with grip 13 affixed to the lower portion of the handle section. In the handle section, the frame comprises two spaced side-by-side portions connected to each other by cross braces 14. The two portions of the handle separate to a greater distance from each other where the handle joins the head section so that the major portion of the ellipsoid shape of the head section comprises a smooth extension of the portions of the handle section. Short segment 18 completes the ellipsoid of the head portion.

Head section 10, as shown in FIGS. 2 and 5 has a peripheral recessed groove 15, and a plurality of holes 23 through which strings 24 are attached.

The composite structure of the frame, as shown in FIGS. 4 and 5, comprises foamed plastic core 22, surrounded by shell 17 comprising a plurality of layers 21, each made of a sheet of graphite fibers, unidirectionally oriented and resin-coated. As shown in FIGS. 3 and 4, each sheet of graphite fibers is arranged at 45° to the long dimension of the structural member, the sheets alternating between +45° and −45° and thus being at right angles to each other. (For simplicity of illustration, fewer graphite fiber layers are shown in FIGS. 4 and 5 than in FIG. 3.) Two opposite faces of the structural member, corresponding to opposite faces of the tennis racket are faced with a final external layer 16 of graphite fiber sheet with fibers 19 aligned along the long dimension of the structural member, the resin-filled spaces between the fibers being shown as 20.

The composite structure of this invention is made in a self-bonding single-step molding process within a rigid mold capable of withstanding the internal forces caused by the pressure developed in the curing cycle. The mold is preferably constructed of tool steel which is chromium plated on its interior surfaces. For short runs, the mold may be constructed of aluminum with anodized interior surfaces.

The graphite fiber sheets used in this invention are made by applying a resinous binder to a sheet of unidirectionally oriented graphite fibers. The resinous binder is applied in liquid state to the graphite fibers and fills the interstices between the fibers before achieving a rigidified state by cooling or curing. The resinous binder may be a thermoplastic material capable of withstanding the curing temperatures to be applied, but is preferably a thermosetting material. Useful thermoplastic materials include nylon, polyethylene, polypropylene, linear polyesters, polycarbonates and acetal resins. Useful thermosetting materials include phenolic resins, cross-linked polyesters, and epoxy resins, a specific example being a cyclized epoxy novolac.

The graphite fibers are preferably of medium modulus, ranging from about 30 million to about 40 million pounds per square inch. Where exceptionally high strength and stiffness are desired, graphite fibers of high modulus, ranging from about 50 million to about 60 million pounds per square inch may be used. Individual graphite filaments are generally of extremely fine diameters (of the order of about 0.0003 inches); and the graphite fibers used to make the graphite sheets generally comprise yarns containing hundreds, or thousands, of individual filaments, as is known in the art.

The graphite fiber layers preferably contain a small amount, up to about 5 percent based on the weight of resinous binder, of graphite whiskers which serve to cross link the graphite fibers and reduce the tendency of the fibers to separate, or fray.

The core composition is suitably a composition having the approximate consistency of a firm putty, or of molding clay. Any of the compositions commercially sold as "intumescent" resinous compositions may be used provided they are of sufficient stiffness to permit endwise insertion of the core strip into the seamless sleeve. Intumescent compositions are commercially used as materials for splicing and filling honeycomb cores used in sandwich constructions. The compositions generally comprise an uncured resin, together with a curing agent, a blowing agent, and usually a flow control material which also adds bulk and body at low weight.

The resin in the core composition is typically an epoxy resin or a phenolic resin. The blowing agent is typically either a compound such as an azo, N-nitroso, carbonate, or sulfonyl hydrazide compound which decomposes when heated to yield nitrogen or carbon dioxide, or a volatile normally liquid material such as pentane, water or a liquid fluorocarbon. Preferred flow control materials include hollow glass or silica microspheres, hollow carbon or graphite microspheres and finely divided expanded vermiculite. Glass or asbestos fibers or mica flakes may also be used. And graphite whiskers may be used advantageously adding strength as well as bulk.

Intumescent resin compositions may be formulated to any desired expansion ratio depending on the amount of blowing agent incorporated. As applied to the instant invention where substantial autogenous pressure in the mold is desired, the intumescent composition has a high expansion ratio and would expand to at least five times its original volume if it were not confined within the mold.

A particularly suitable intumescent resin composition is one which contains from about 30 to about 80 volume percent of a low density cellular filler material, such as chopped cork, and from about zero to about 60 weight percent of a high density weight control material, such as barium sulfate, as described in the concurrently filed and coassigned application of Andrew M. Cecka and Paul G. Pawling, Ser. No. 703137. The cellular filler material contributes to the bulk and stiffness of the composition. It provides sufficient integrity to the core strips so that they can be transported endwise into the seamless sleeves by a current of air without collapsing. It also provides sufficient bulk at low weight so that the core expands by only a relatively small amount, from about 10% to about 30%, in the mold and thereby avoids forming large pores in the core.

In preparing the structural member of this invention, the foam composition is molded, as shown in FIG. 6, into flat slab 25 and slit into strips 22 which become the core members. Each strip is then rolled to a rounded cross section and inserted, as shown in FIG. 7, into seamless sleeve 26 by compressed air. Sleeve 26 is, as shown in FIG. 8, of greater diameter than the diameter of core strip 22 to permit the expansion of the core strip to its final cross-sectional dimension.

The core within its sleeve is then wrapped with a plurality of plies of resin-impregnated unidirectional graphite fiber sheets, alternately cross-plied to each other. The plies are preferably wrapped with their fibers running alternately at +45° and −45° to the long dimension of the core, and typically about four layers, are employed. Specifically, two elongated strips are provided, each strip being as long as the desired structural element and at least as wide as two circumferences thereof, one of the strips having fibers running at +45° and the other having fibers running at −45°. The strips are assembled to double thickness, and the assembly is wrapped around the core so that there are four layers of graphite fiber sets with fiber orientation alternating between +45° and −45°.

To prevent fraying of the innermost graphite fiber layers at their leading edge, a strip of veiling is first wrapped around the core in its sleeve and the leading edge of the first graphite layers is placed under the trailing edge of the veiling strip. Similarly, a strip of veiling is wrapped around the outermost of these layers with the leading edge of the veiling covering the trailing edge of the graphite layers.

An additional layer of graphite sheet is laid into the bottom of the mold with its graphite fibers directed along the longitudinal direction of the mold. The wrapped core is formed to the shape of the mold running from one end of the handle up the handle, around the frame, and then down the handle to its end. A second short section of wrapped core is inserted in the mold and spliced to obtain a continuum of the composite structure to complete the closed ellipsoid shape of the head of the frame at the location where the handle sections separate from each other at the location where the handle joins the head.

Another layer of graphite sheet with graphite fibers directed along the longitudinal direction of the mold is then laid upon the wrapped core in the mold; and the mold is then closed and clamped and then heated to cure and expand the core composition. The clamping may be by a hydraulic press, by tie bars or high strength clamps; and the mold may be heated by hot platens on a hydraulic press or by insertion into an oven. The curing temperature is suitably in the range of about 150° to about 350° F. and the heating period is suitably from about ⅛ to about 1 hour, depending on the nature of the resin formulation and the nature of the curing agents.

The heat during the curing cycle activates the foaming agent in the core and causes the foam to expand. As the foam expands, it generates pressure within the confined mold cavity and causes intimate bonding of the core to its sleeve and of the sleeve to the resin-impregnated graphite fiber shell. The generated pressure also serves to bond together the individual graphite fiber layers into a unitary shell with unusual structural capabilities. It is to be understood that the transverse cross-sectional area of the mold cavity is substantially less than would be the transverse cross-sectional area of the wound core material if it were permitted free expansion. The transverse cross-sectional area of the sleeve is somewhat larger than the space within the mold cavity to provide a factor of safety and avoid subjecting the thin sleeve to excessive internal pressure without the backup support of the mold. The sleeve remains slightly crinkled after expansion.

Bonding in this manner under internal pressure produces a composite with excellent structural integrity which exhibits no voids or soft spots. The wraparound of the core by the graphite sheets produces a structure in which the shell completely encases the core at any transverse cross section and thereby provides a box beam construction of exceptional strength and stiffness for its weight. During the expansion of the core material, the graphite sheets, which have only limited expandability, tend to unwind from the core to some extent but nevertheless completely encase it.

Upon completion of the curing cycle, the mold is cooled and then opened; and the molded frame is removed.

Holes for the tennis strings may be drilled in the head but are preferably provided by removable pins inserted into the head portion of the wrapped core before the curing thereof in the mold.

Thereafter the balance of the frame is checked and adjusted, if necessary, by removing material or adding weights. The frame is then painted or coated with a scuff and abrasion resistant paint or film, applied by spraying, dipping, or bonding, followed by curing. The desired grip is then assembled or installed using either an adhesive or mechanical bond. After installation of the tennis strings, weights can be added, if desired, to achieve the desired balance and total weight of the racket.

EXAMPLE

This example describes a preferred embodiment of an improved graphite composite, medium weight tennis racket of this invention and the method for producing it.

The foam core, which subsequently is foamed during curing, was prepared by blending:

| Component | % by Weight |
|---|---|
| Resins | |
| diglycidyl ether from epichlorohydrin and bisphenol A melting at 70° C and having an epoxide equivalent weight of 475 | 7.43 |
| diglycidyl ether from epichlorohydrin and bisphenol A melting at 80° C. and having an epoxide equivalent weight of 600 | 25.79 |
| cycloaliphatic novolac | 11.13 |
| Flow Control Additive | 0.45 |
| Blowing Agents | |
| di-N-nitrosopentanethylene tetraamine (40% + 60% inert filler) | 1.08 |
| azodiisobutyronitrite | 4.62 |
| Accelerator | |
| 3-(3,4-dichlorophenyl) (-1,1-dimethylurea) | 1.08 |
| Curing Agent | |
| dicyandiamide | 6.52 |
| Weight Control Additive | |
| barium sulfate | 27.15 |
| Low Density Filler | |
| chopped cork (−10 mesh) | 14.75 |
| | 100.00 |

The flow control additive was a paste of one part of lamp black in 3 parts of an epichlorohydrin/bisphenol A epoxy resin having an epoxide equivalent weight of 185.

The foam core was prepared by melting and blending the resin components of the formulation together with the flow control, accelerating and curing components; and then adding the other dry constituents, including the inert, weight control additives. Then this mixture was allowed to cool to a solid state, and was subsequently crushed after cooling to produce granules. The granules were formed into a slab shape under heat and pressure. The slab was cut to strips approximately 0.45 inch by 0.45 inch, which were rolled to about 0.50 inch diameter.

The rolled foam core was encased in a 0.0015 inch wall thickness by ⅝ inch diameter regenerated cellulose core sleeve. This diameter core sealant tube is of a size that essentially fills to full diameter during the curing operation but is somewhat undersized in relation to the mold space so that the sleeve remains somewhat crinkled in the final product.

The sealed foam core next was wrapped with bias cut strips of broadgoods of unidirectionally oriented graphite fibers bonded with an epoxy resin. The broadgoods was prepared by wrapping 55% by weight graphite yarn (fiber tows) on a drum, and impregnating them with 45% by weight of epoxy resin by doctoring. The epoxy resin formulation contained:

| Component | % by Weight |
|---|---|
| cycloaliphatic novolac | 78.13 |
| hardner | 15.62 |
| flow control additive | 3.91 |
| graphite whiskers | 2.34 |
| | 100.00 |

The flow control additive was the same as the flow control additive in the core composition.

The hardener was a mixture of 12 parts by weight of dimethylaminomethyl phenol, 24 parts of p,p'-methylene dianiline and 10 parts of menthane diamine.

The graphite whiskers averaged 100 microns in length and 10 microns in diameter.

After the broadgoods had been staged for 16 hours, strips 3-¾ inches width were cut on a 45° bias with respect to the axis of the graphite fiber tows. Two strips were assembled to double width so that they were applied at ±45° fiber orientations. For each tennis racket, one such bias strip assembly 60 inch length was required for the main body of the composite tennis racket, a 6 inch length for the throat piece, and a 1-½ inch length in the top brace. Then the ±45 inch bias broadgoods strips were wrapped around the sealed foam core using a rolling machine.

Veils were used when wrapping the sealed foam core. A spun, nonwoven nylon veil about 0.0015 inch thickness by 2 inches width and weighing about 2 ounces per square yard with a length slightly longer than the core was wrapped around the core and over the first edge of the bias oriented graphite fiber broadgoods strips to be wrapped around the core. This leading veil helps in starting the rolling or wrapping of the core, and tends to prevent separation of the graphite fibers in the bias cross-plies. A second veil, spun, nonwoven polyester of about 0.006 inch thickness by 2-½ inch width and weighing about 4 ounces per square yard with a length slightly longer than the core, was wrapped around the core over the last edge of the bias oriented cross-ply graphite fiber broadgoods strips to be wrapped around the core. This final trailing or outer veil also tends to prevent separation of the graphite fibers in the bias cross-plies. These two veils, especially the outer veil, additionally aid in eliminating surface porosity in the final molded part, and facilitate formation of a uniform resinous film over the surface of the final molded struture.

The cross-ply bias broadgoods strips were wrapped as tightly as possible, and wrapping conditions were optimum when the cross-ply assembly had undergone staging of the resin or had the desired tackiness.

The mold used in producing the tennis racket shape was first cleaned and then further prepared by spraying with a mold release agent.

Capping layers made of graphite fiber plus epoxy resin were placed in the top cavity and in the bottom cavity of the mold. The capping layers were made with the same graphite fibers and the same epoxy resin formulation as described in connection with the bias-cut layers. The lay-up of these graphite tows in the mold for the caps involved a longitudinal orientation placement of an appropriate amount of graphite fibers around the head, through the throat area, down the handle, and through the braces to achieve the desired graphite capping layers on both faces of the final graphite structure. The lay-up sequence generally provided placement of about an equal number of tows in all positions in the cavities in both the top and bottom of the mold.

The wrapped, sealed foam core was placed on top of the capping layer in the bottom cavity of the mold. The 60 inches length of the wrapped, sealed foam core was placed to extend from the end of one side of the handle upward and around the head and back again to the end of the other side of the handle in a continuous path. The 6 inches length of wrapped, sealed foamed core for the throat piece and the 1-½ inches length for the brace were spliced into the 60 inches length so as to have a continuous path for the foam core and for the wrapped bias cut strips of graphite broadgoods.

Next, the mold was closed. First, the top part of the mold, which contained the graphite capping layer in the top cavity of the mold was seated on the foam core, and the movable top of the head was closed. Then, the side parts were closed. The side parts included tapered pins that deformed the graphite plus epoxy resin in the case to produce dimples having a 1/16 inch radius and a depth of about 0.100 to 0.125 inches. Then, the assembled mold has placed in a press, heated to 300° F. and held for one hour to cure the article. A force of about 15,000 pounds was applied and maintained on the mold during the curing. Then, the mold was opened and the part removed.

The molded graphite composite tennis racket had a uniform cross-section through all parts of the head, with cross-sectional dimensions of about 0.650 inches height and 0.425 inches width, with a ⅛ inch radius on all corners. Dimples for the stringing holes were also molded as described above into the composite to provide reinforcement for the strings by the graphite fibers in the dimples, and a smooth radius to avoid cutting the strings. These dimples provide a means to maintain string tension for a long time, and eliminate the need for grommets, which are undesirable since they tend to become loosened and sometimes break.

The subsequent finishing operations on the improved graphite composite tennis racket followed state-of-the-art practices and do not constitute a portion of this invention.

These finishing operations included deflashing of any excess material, sanding the surfaces smooth, drilling the stringing holes, deburring the stringing holes, and spray finishing the tennis racket with a urethane coating. Then, appropriate decals were applied, the grips were assembled onto the racket, and the racket was strung by conventional practices.

The rackets exhibited outstanding properties and excellent playing characteristics, along with long life and good durability as discussed in the following section on properties and characteristics of the improved graphite composite tennis racket of this invention.

It is to be understood that the above formulations may be modified without departing from the scope of the invention and that other resins and combinations of resins may be used in place of or in addition to those specified above. Modifiers, such as polyamides, acrylic resins, nitrile resins, polyesters or polyvinyl butyral may also be used.

While chipped cork is the preferred low density filler, other low density materials may be used such as hollow glass or resinous spheres, expanded vermiculite, or a chopped closed cell polyurethane or polystyrene foam. Some low density materials have a tendency to be crushed during the foaming of the core and are therefore of lesser benefit than cork which maintains its integrity.

The seamless sleeve of regenerated cellulose film is essential to this invention. Prior to this invention, sleeves made of a polyester film were used which had a longitudinal seam weld. Such sleeves, as indicated above, were found to be subject to mechanical damage or rupture during handling and subject to the development of leaks along or through the longitudinal seam weld. Polyethylene sleeves and polyvinyl chloride sleeves do not bond well to the core or to the shell.

The unique properties of the structure of this invention are obtained from the properties of the core, the properties of the shell, and most importantly from the properties obtained by the coaction of the core and the shell.

The core provides stability to the structure by firmly holding the shell in place. It also promotes high damping characteristics and thereby substantially reduces vibrations and shock, reduces the tendency toward fatigue failure, reduces stresses, and reduces buckling stress and any tendency toward failure by buckling. These desirable benefits are achieved with little added weight over the weight of a hollow shell structure.

The oriented graphite fiber structure in the shell possesses high strength to weight and stiffness to weight ratios. The use of varying amounts and kinds of graphite fibers in the shell and varying fiber orientations therein provides the ability to tailor the properties of the composite structure to obtain the desired flexural stiffness, torsional resistance, and balance. The graphite fiber shell also exhibits excellent resistance to creep and provides a high endurance life.

The composite structure produced by the coaction of the oriented graphite fiber shell and the lightweight core is of lightweight for its strength and stiffness and permits better weight distribution in a specialty product, such as a tennis racket, by permitting the addition of weight to the preferred areas of the structure. In a tennis racket, this feature of the novel composite structure greatly improves the control and playability characteristics.

The composite structure also exhibits minimal dimensional changes with temperature, resulting in excellent stability and constant string tension and thereby providing uniform playing characteristics under a wide range of environmental conditions.

The method of manufacture of the composite structure of this invention permits a wide versatility in design of specific products to meet a wide range of flexural and torsional characteristics.

In a tennis racket, the composite structure of this invention provides properties which result in the racket having a large "sweet spot" which permits excellent playability and control even when the tennis ball is not hit dead center on the racket. The enlarged areas of the "sweet spot" in tennis racket frames using the composite structure of this invention provides overall superior playing characteristics when compared to any prior art construction.

Tennis racket frame constructions are tested objectively in several ways including static non-destructive tests, static destruction or crush tests and dynamic tests, as well as subjectively by player evaluation. Static tests include evaluation of deflections under static loads to determine frame stiffness in flexure, torsion and head distortion. Dynamic testing subjects the tennis racket to a series of impacts, sometimes called "whacks" to simulate thousands of service hits on tennis balls.

In all of the above-described tests, the structure of this invention achieves the desired level of performance at a lower weight than are achieved in prior art constructions. For example, a racket with grips and strings, prepared in accordance with this invention and weighing between 11-⅛ and 12-⅛ ounces will meet or better the test values obtained on a conventional wood or metal racket weighing between 13-⅞ and 14-⅛ ounces.

The product of this invention has been described with particular reference to a tennis racket, but it will be understood by those skilled in the art that the principles of this invention are applicable to other products in which strength and rigidity are desired at minimum weight. Such products include skis, hockey sticks, archery bows, and head and body protection structures, such as helmets, and shoulder and shin guards. The structure of this invention is also useful for golf club shafts as a replacement for the hollow center graphite shafts now in use for those golfers who prefer added stiffness in their clubs.

What is claimed is:

1. A method of producing a structural member of high strength to weight ratio comprising inserting an elongated core strip comprising a foamable resin composition within a seamless sleeve made of a thin, flexible cellulosic film, arranging within a mold cavity an outer shell comprising at least one layer of unidirectionally oriented resin-coated graphite fibers in sheet foam and said elongated core within said sleeve with said shell surrounding said core and sleeve, sealing said mold cavity, activating said foamable resin composition to cause expansion thereof and generate pressure within said mold cavity pressing said core within said sleeve against said shell and thereby providing intimate bonding of said core to said shell, and thereafter removing said core and said shell from said mold cavity as an integral composite structure.

2. The method of claim 1 wherein a plurality of layers of unidirectionally oriented resin-coated graphite fibers are arranged within said mold cavity and about said core, at least one of said layers having its fibers oriented in a direction different from the direction of orientation of the fibers in at least one other of said layers.

3. The method of claim 2, wherein said layers alternate in direction of orientation from about $+45°$ to about $-45°$ to the direction of the long dimension of the member.

4. The method of claim 1 wherein said mold cavity is of smaller cross-sectional area than the cross-sectional area of said core would be if said core were permitted free expansion.

5. The method of claim 4 wherein said mold cavity is of somewhat smaller cross-sectional area than the cross-sectional area of said sleeve when said sleeve is fully extended.

6. The method of claim 2 wherein said mold cavity is shaped in the form of a tennis racket frame having a handle with a grip at one end and a head of ellipsoid shape attached to the other end.

7. A method of producing a tennis racket frame of high strength to weight ratio comprising providing a mold cavity shaped in the form of a tennis racket frame having a handle with a grip at one end and a head of ellipsoid shape attached to the other end, the handle grip of said mold cavity having two substantially parallel cavity portions corresponding to two sides of said handle, forming an elongted core strip comprising a foamable resin composition, inserting said core strip into a seamless sleeve made of a thin, flexible cellulosic film which sleeve is of greater cross-sectional area than said core strip, wrapping said core strip within said sleeve with a plurality of layers of unidirectionally oriented resin-coated graphite fibers, at least one of said layers having its fibers oriented in a direction different from the direction of orientation of the fibers in at least one other of said layers, arranging said wrapped core within said mold cavity with both ends of said wrapped core at the grip end of said mold, said wrapped core extending from one of its ends at the grip end of said mold cavity, up one of said substantially parallel cavity portions in the handle portion of said mold cavity, around a major portion of the head portion of said mold cavity and down the other substantially parallel cavity portion in the handle portion of said mold cavity to terminate at the grip end of said mold cavity, thereafter sealing said mold cavity, heating said foamable resin composition to cause expansion thereof and generate pressure within said mold cavity pressing said core against said layers of graphite fibers and thereby provide intimate bonding of said core to said layers, and thereafter removing said expanded wrapped core as an integral composite tennis racket frame.

8. The method of claim 7 wherein said foamable resin composition contains from about 30 to about 80 volume percent of a low density filler material.

9. The method of claim 8 wherein said low density filler material is chopped cork.

10. The method of claim 1 wherein said sleeve has a transverse cross-sectional area somewhat larger than free space within said mold cavity whereby said sleeve remains slightly crinkled after expansion.

11. The method of claim 7 wherein said sleeve has a transverse cross-sectional area somewhat larger than free space within said mold cavity whereby said sleeve remains slightly crinkled after expansion.

* * * * *